US011140314B2

(12) United States Patent
Yoneno

(10) Patent No.: US 11,140,314 B2
(45) Date of Patent: Oct. 5, 2021

(54) IMAGING DISPLAY DEVICE, IMAGING DISPLAY SYSTEM, AND CONTROL METHOD OF IMAGING DISPLAY DEVICE

(71) Applicant: SEIKO EPSON CORPORATION, Tokyo (JP)

(72) Inventor: Kunio Yoneno, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/105,518

(22) Filed: Nov. 26, 2020

(65) Prior Publication Data

US 2021/0168280 A1 Jun. 3, 2021

(30) Foreign Application Priority Data

Nov. 29, 2019 (JP) .............................. JP2019-216433

(51) Int. Cl.
*H04N 7/15* (2006.01)
*H04N 5/232* (2006.01)
*G10L 25/78* (2013.01)
*H04N 7/14* (2006.01)

(52) U.S. Cl.
CPC ......... *H04N 5/23219* (2013.01); *G10L 25/78* (2013.01); *H04N 5/23299* (2018.08); *H04N 7/144* (2013.01); *H04N 7/15* (2013.01)

(58) Field of Classification Search
CPC . H04N 5/232; H04N 7/15; H04N 7/14; G10L 25/78
USPC ............................................ 348/14.01–14.16
See application file for complete search history.

(56) References Cited

U.S. PATENT DOCUMENTS

| 2012/0169838 | A1* | 7/2012 | Sekine | H04N 7/144 348/14.16 |
| 2012/0249722 | A1* | 10/2012 | Wang | H04L 12/1827 348/14.05 |
| 2013/0169740 | A1* | 7/2013 | Lee | H04N 21/44218 348/14.05 |
| 2014/0267584 | A1* | 9/2014 | Atzpadin | H04N 7/144 348/14.16 |
| 2016/0050391 | A1* | 2/2016 | Schultz | H04N 7/144 348/14.07 |

(Continued)

FOREIGN PATENT DOCUMENTS

| JP | 2010171573 | 8/2010 |
| JP | 2012010059 | 1/2012 |

(Continued)

*Primary Examiner* — Melur Ramakrishnaiah
(74) *Attorney, Agent, or Firm* — JCIPRNET

(57) ABSTRACT

An imaging display device includes an imaging device configured to image a region including a face of an observer and a background, the imaging device being provided to have an optical axis tiltable in a vertical plane, a rotary drive unit configured to incline the imaging device by a predetermined angle in the vertical plane, a display device including a display unit configured to display a captured image captured by the imaging device, and a control unit configured to control the rotary drive unit. The control unit includes a face detection unit configured to detect a face image of the observer from the captured image, and an angle control unit configured to calculate, based on a vertical dimension of the face image, a rotation angle of the imaging device, and to transmit a control signal based on the rotation angle to the rotary drive unit.

9 Claims, 7 Drawing Sheets

(56) References Cited

U.S. PATENT DOCUMENTS

2017/0308992 A1* 10/2017 Chalom ............... G06K 9/4642
2018/0365809 A1* 12/2018 Cutler ....................... G06T 7/50

FOREIGN PATENT DOCUMENTS

| JP | 2013031013 | 2/2013 |
| JP | 2016082448 | 5/2016 |
| JP | 2016111521 | 6/2016 |
| WO | 2009119288 | 10/2009 |

* cited by examiner

IMAGING DISPLAY DEVICE, IMAGING DISPLAY SYSTEM, AND CONTROL METHOD OF IMAGING DISPLAY DEVICE

The present application is based on, and claims priority from JP Application Serial Number 2019-216433, filed Nov. 29, 2019, the disclosure of which is hereby incorporated by reference herein in its entirety.

BACKGROUND

1. Technical Field

The present disclosure relates to an imaging display device, an imaging display system, and a control method of an imaging display device.

2. Related Art

A so-called video conference system has hitherto been known. With this system, video images of participants who are present at a plurality of physically remote locations are displayed on a screen, and a conference is conducted through use of the displayed video images and sound.

JP-A-2016-111521 discloses an information processing device used for a video conference system, and the information processing device includes a display means for displaying display information with respect to a user, an image capturing means for capturing an image of the front side of the display means, an angle detection means for detecting an installation angle of a housing, a determination means for determining, based on the installation angle detected by the angle detection means, a clipping range obtained by clipping a part of the captured image, a clipping means for clipping an image in the clipping range from the captured image.

According to the image processing device of JP-A-2016-111521, in a case where, for example, a camera is oriented upward with respect to a head of a user after the user adjusts the display means, such as a display, to an easy-to-view angle, an excessive region displayed above the head can be eliminated from a screen. However, when the camera is oriented upward with respect to the head of the user, a person having a downward line of sight is displayed on a display screen. Thus, when the user views the display screen, the line of sight of the user and the line of sight of the person displayed on the display screen are deviated from each other. As a result, there is a problem in that the user feels a sense of incongruity.

SUMMARY

In order to solve the above-mentioned problem, an imaging display device according to one aspect of the present disclosure includes an imaging device configured to image a region including a face of an observer and a background, the imaging device being provided to have an optical axis tiltable in a vertical plane, a rotary drive unit configured to incline the imaging device by a predetermined angle in the vertical plane, a display device including a display unit configured to display a captured image captured by the imaging device, and a control unit configured to control the rotary drive unit, wherein the control unit includes a face detection unit configured to detect a face image of the observer from the captured image, and an angle control unit configured to calculate, based on a vertical dimension of the face image detected by the face detection unit, a rotation angle of the imaging device, and to transmit a control signal based on the rotation angle to the rotary drive unit.

In the imaging display device according to one aspect of the present disclosure, the angle control unit may calculate the rotation angle, based on a vertical dimension of the captured image, a dimension between an upper end of the face image in the captured image and an upper end of an entirety of the captured image, and a vertical angle of view of the imaging device.

In the imaging display device according to one aspect of the present disclosure, when the imaging device images a plurality of faces of a plurality of observers, the face detection unit may detect, from a plurality of face images, a face image of which the vertical dimension of the face image is maximum.

In the imaging display device according to one aspect of the present disclosure, when the imaging device images a plurality of faces of a plurality of observers, the face detection unit may detect, from a plurality of face images, a face image of which an interval between an upper end of the face image and an upper end of an entirety of a captured image is minimum.

In the imaging display device according to one aspect of the present disclosure, when the imaging device images a plurality of faces of a plurality of observers, the face detection unit may detect, from a plurality of face images, a face image closest to a center of an entirety of a captured image in a horizontal direction.

The imaging display device according to one aspect of the present disclosure may further include a sound detection device configured to detect sound including a voice of an observer, and when the imaging device images a plurality of faces of a plurality of observers, the face detection unit may detect, from a plurality of face images, a face image positioned in a sound source direction for which a sound volume detected by the sound detection device is maximum.

In the imaging display device according to one aspect of the present disclosure, the imaging device may be provided above the display unit of the display device.

The imaging display device according to one aspect of the present disclosure may further include a signal generation unit configured to generate an image signal, based on the captured image.

An imaging display system according to one aspect of the present disclosure includes a first terminal device provided at a first location where a first observer is present, a second terminal device provided at a second location where a second observer is present, and a communication unit configured to perform communication of the image signal between the first terminal device and the second terminal device, wherein at least one of the first terminal device and the second terminal device is constituted of the imaging display device according to one aspect of the present disclosure, a first image signal generated by the first terminal device is transmitted to the second terminal device, so that a captured image captured by the first terminal device is displayed by the second terminal device, and a second image signal generated by the second terminal device is transmitted to the first terminal device, so that a captured image captured by the second terminal device is displayed by the first terminal device.

A control method of an imaging display device according to one aspect of the present disclosure is a control method of an imaging display device including an imaging device configured to image a region including a face of an observer and a background, the imaging device being provided to have an optical axis tiltable in a vertical plane, a rotary drive unit configured to rotate the imaging device by a predetermined angle in the vertical plane, a display device including a display unit configured to display a captured image captured by the imaging device, and a control unit configured to control the rotary drive unit, wherein the control unit is configured to detect a face image of the observer from the captured image, calculate a rotation angle of the imaging device, based on a vertical dimension of the face image, and control the rotary drive unit, based on the rotation angle.

DESCRIPTION OF EXEMPLARY EMBODIMENTS

First Exemplary Embodiment

With reference to FIG. 1 to FIG. 6, a first exemplary embodiment of the present disclosure is described below.

Figure 1:
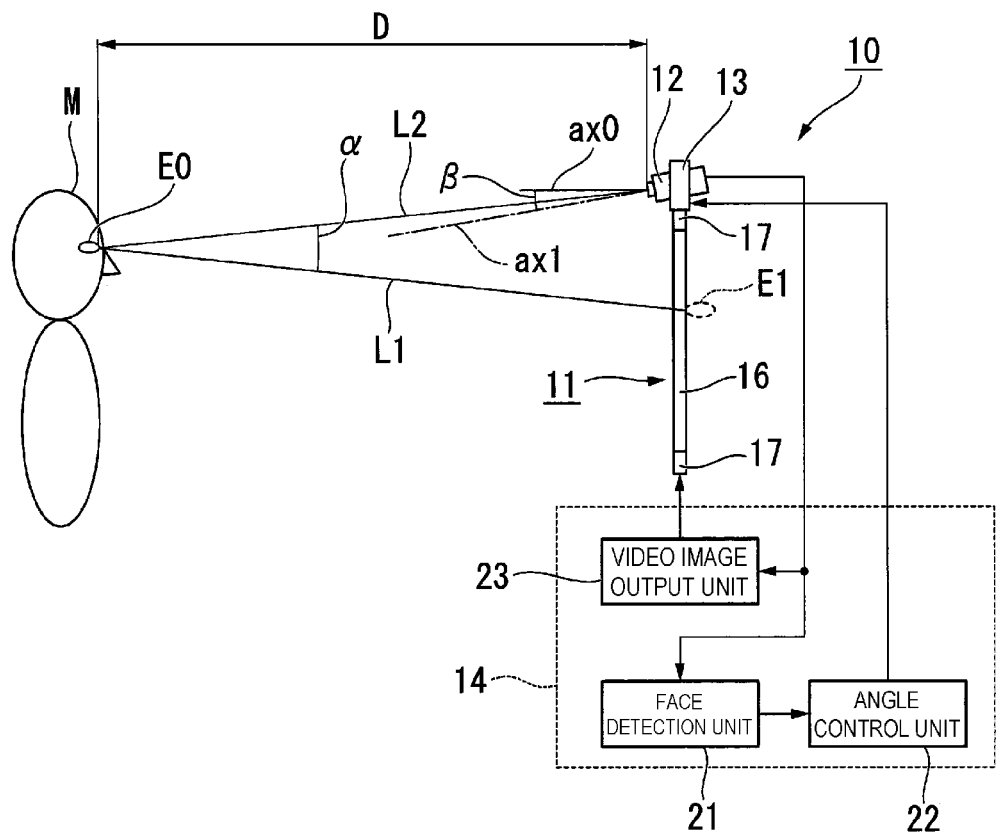
FIG. 1 is a schematic configuration view of an imaging display device according to a first exemplary embodiment.

FIG. 1 is a schematic configuration view of an imaging display device according to the first exemplary embodiment.

Note that, in the drawings, the dimensions of some components may be scaled differently for ease of understanding for the components.

The imaging display device according to the present exemplary embodiment includes a configuration of a terminal device used at one location in a video conference system, but does not include a communication unit that performs communication with another location. In view of this, in the present exemplary embodiment, a usage mode is not for a video conference, but description is made by assuming a case where a user views his or her own face with a display device.

As illustrated in FIG. 1, an imaging display device 10 according to the first exemplary embodiment includes a display device 11, an imaging device 12, a rotary drive unit 13, and a control unit 14.

The display device 11 is constituted of an image display device such as a liquid crystal display. The display device 11 includes a display unit 16 and a frame unit 17 that accommodates the display unit 16. The display unit 16 displays a captured image captured by the imaging device 12. The display unit 16 has a size of approximately 50 inches to 60 inches, for example.

The imaging device 12 is constituted of a camera, for example. The imaging device 12 is provided at a position of the frame unit 17 of the display device 11, which corresponds to a position above the display unit 16. The imaging device 12 is installed in such a way that an optical axis ax1 of the imaging device 12 can be inclined in a vertical plane through intermediation of the rotary drive unit 13 described later. The imaging device 12 images a region including a face of an observer M and a background. The optical axis ax1 of the imaging device 12 is an optical axis of an imaging lens of the imaging device 12. Note that the imaging device 12 may be provided at a position of the frame unit 17 of the display device 11, which corresponds to a position downward of the display unit 16. However, it is generally said that, in deviation of a line of sight of a human, an upper allowance angle is approximately 11 degrees and a lower allowance angle is approximately 9 degrees. Thus, the imaging device 12 is preferably provided above the display unit 16.

The rotary drive unit 13 is constituted of, for example, a motor (omitted in illustration) and a rotary transmission mechanism (omitted in illustration). The rotary drive unit 13 receives a control signal from an angle control unit 22 described later, and rotates the imaging device 12 at a predetermined rotation angle in the vertical plane, based on the control signal.

The control unit 14 controls the rotary drive unit 13. The control unit 14 includes a face detection unit 21, the angle control unit 22, and a video image output unit 23.

The face detection unit 21 detects a face image of the observer M from the captured image captured by the imaging device 12. The angle control unit 22 calculates the rotation angle of the imaging device 12, based on a vertical dimension of the face image detected by the face detection unit 21, and transmits a control signal based on the rotation angle to the rotary drive unit 13. The video image output unit 23 outputs an image signal corresponding to the captured image captured by the imaging device 12, to the display device 11.

In the control unit 14, the face detection unit 21 detects a face image based on the captured image captured by the imaging device 12, and information including a position and a size of the detected face image is input to the angle control unit 22. The angle control unit 22 calculates the rotation angle of the imaging device 12, based on the information including the position and the size of the face image, and outputs a control signal to the rotary drive unit 13. In this manner, the imaging display device 10 is configured to control an inclination angle β of the imaging device 12, based on the information including the position and the size of the detected face image.

The inclination angle β of the imaging device 12 is defined as an angle formed between a horizontal axis ax0 and the optical axis ax1 of the imaging device 12.

Figure 2:
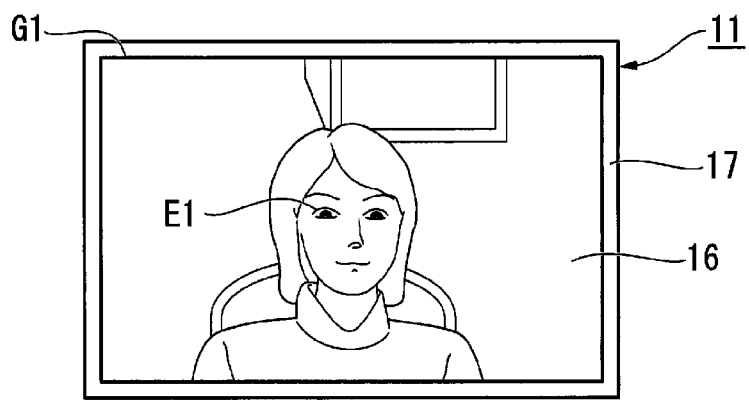
FIG. 2 is a view illustrating an example of a display image.

FIG. 2 is a view illustrating an example of a display image G1 displayed by the display device 11.

As illustrated in FIG. 2, the display unit 16 of the display device 11 displays the face of the observer M and the background as the display image G1.

Here, it is assumed that the observer M observes an eye E1 on the image displayed by the display unit 16. In the example of FIG. 1, for example, the observer M stands in front of the display device 11, a position of an eye E0 of the observer M is higher than the position of the eye E1 on the image. Thus, the observer M looks down at the eye E1 on the image displayed by the display unit 16. Note that the observer M may be seated in front of the display device 11, and a positional relationship in which the position of the eye E0 of the observer M is lower than the position of the eye E1 on the image and the observer M looks up at the eye E1 on the image may be established.

Further, in the example of FIG. 1, the installation position of the imaging device 12 is higher than the head of the observer M. In this case, the imaging device 12 images the observer M under a state of diagonally looking down from the upper side of the display device 11, and at the same time, a line of sight along which the observer M views the eye E1 on the image is oriented diagonally downward. Thus, the lines of sight do not match each other. Here, an angle formed between a straight line L1 connecting the eye E0 of the observer M and the eye E1 on the image to each other and a straight line L2 connecting the eye E0 of the observer M and the center of the lens of the imaging device 12 to each other is defined as a difference angle $\alpha$. As the difference angle $\alpha$ is smaller, that is, the position of the eye E1 on the image and the position of the imaging device 12 are closer to each other, deviation of the lines of sight can be reduced.

Figure 4:
FIG. 4 is a view illustrating an example of a display image with a small inclination angle.

FIG. 4 is a view illustrating an example of a display image G2 when the inclination angle $\beta$ of the imaging device 12 is large.

As illustrated in FIG. 4, when the inclination angle $\beta$ of the imaging device 12 is large, the eye E1 on the image is displayed in a relatively upper part of the display unit 16. Thus, the difference angle $\alpha$ is small, and deviation of the lines of sight is considerably small. However, the inclination angle $\beta$ of the imaging device 12 is large. Thus, the entirety of the observer M is not displayed. For example, part of the head is out of the frame unit 17 of the display device 11 in some cases.

Figure 3:
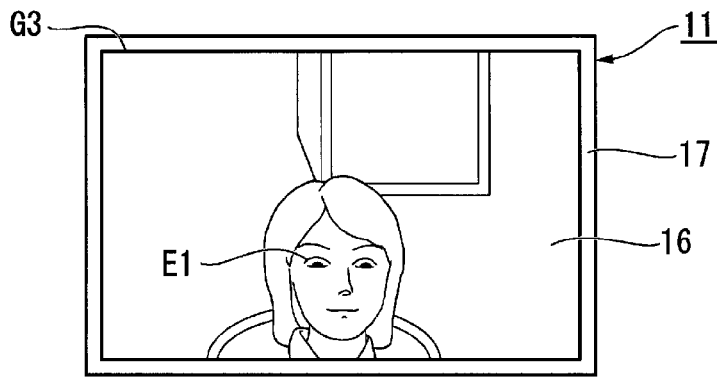
FIG. 3 is a view illustrating an example of a display image with a large inclination angle.

In contrast, FIG. 3 is a view illustrating an example of a display image G3 when the inclination angle $\beta$ of the imaging device 12 is small.

As illustrated in FIG. 3, when the inclination angle $\beta$ of the imaging device 12 is small, the background is largely displayed above the head on the image. As in FIG. 3, part of the head is prevented from being out of the frame unit 17 of the display device 11. However, the eye E1 on the image is displayed in a relatively lower part of the display unit 16. Thus, the difference angle $\alpha$ is large, and deviation of the lines of sight is considerably large.

FIG. 2 that is first illustrated shows the display image of the imaging display device 10 according to the present exemplary embodiment in which the inclination angle $\beta$ of the imaging device 12 is suitably set. Thus, as compared to FIG. 3 and FIG. 4, the position of the head in the display unit 16 and deviation of the lines of sight are well balanced. Specifically, the lines of sight are slightly deviated, but the face can be observed at a natural position without feeling a strong sense of incongruity about the deviation of the lines of sight.

Note that, in the case of the present exemplary embodiment, the display device 11 is fixed under a state of being installed in a room. A relative relationship between the height of the eye E0 of the observer M and the height of the display device 11 in FIG. 1 is a fixed value with parameters such as the height of the observer M, a height of a chair on which the observer M is seated, and a seated height. Therefore, the optimal inclination angle $\beta$ differs depending on a distance between the observer M and the display device 11, that is, an observation distance, and also differs depending on individuals.

A method in which the control unit 14 calculates the inclination angle $\beta$ of the imaging device 12 is described below.

Figure 5:
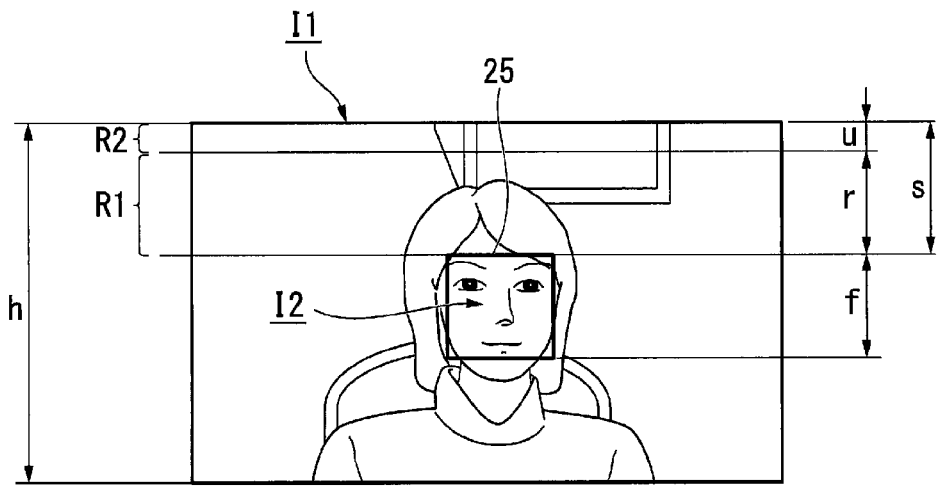
FIG. 5 is a view illustrating a detection result obtained by a face detection unit.

FIG. 5 is a view illustrating a detection result obtained by the face detection unit 21.

As illustrated in FIG. 5, the face detection unit 21 detects a face image I2 from a captured image I1 and sets a face detection frame 25 corresponds to the face image I2, through use of publicly-known face detection algorithm.

Here, a vertical dimension of the captured image I1 is indicated with h, a vertical dimension of the face detection frame 25 is indicated with f, and a dimension from the upper end of the face detection frame 25 to the upper end of the captured image I1 is indicated with s. Further, in the dimension s, a vertical dimension of the display region R1 is indicated with r, and a vertical dimension of an unnecessary region R2 is indicated with u. Specifically, in the region from the upper end of the face detection frame 25 to the upper end of the captured image I1, the display region R1 corresponds to a region that is displayed by the display unit 16. In the region from the upper end of the face detection frame 25 to the upper end of the captured image I1, the unnecessary region R2 corresponds to a region that is not displayed by the display unit 16. Each of the parameters h, f, s, r, and u described above is expressed in a pixel unit, and is output from the face detection unit 21 to the angle control unit 22. Note that the face detection frame 25 indicates the position of the face image I2 during image processing, and hence is not required to be displayed by the display unit 16.

Figure 6:
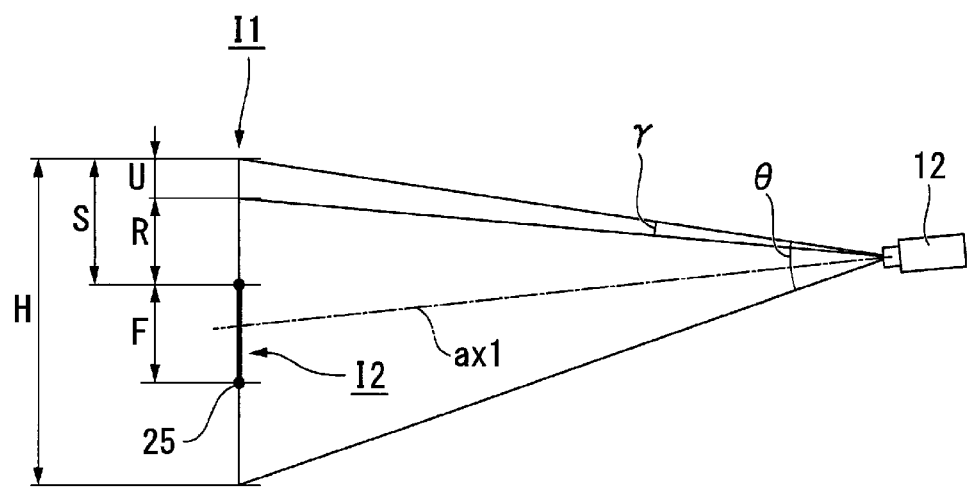
FIG. 6 is a view describing a relative positional relationship between a captured image and an imaging device.

FIG. 6 is a view describing a relative positional relationship between the captured image I1 and the imaging device 12. In FIG. 6, a part of the captured image I1, which corresponds to the face image I2, is indicated with a bold straight line in a simple manner. Further, the upper end and the lower end of the bold straight line correspond to the position of the face detection frame 25. Reference symbols H, F, S, R, and U given as upper-case letters express the reference symbols given as lower-case letters in FIG. 5 in an actual dimension unit. Specifically, a vertical dimension of the captured image I1 is indicated with H, a vertical dimension of the face detection frame 25, that is, the face image I2, is indicated with F, and a distance from the upper end of the face detection frame 25 to the upper end of the captured image I1 is indicated with S. Further, in the distance S, a vertical dimension of the display region R1 is indicated with R, and a vertical dimension of the unnecessary region R2 is indicated with U. A horizontal distance from the observer M to the imaging device 12 is indicated with D. A vertical angle of view of the imaging device 12 is indicated with G.

Next, based on the detection result illustrated in FIG. 6, the angle control unit 22 calculates a rotation angle $\gamma$ of the imaging device 12 by the following procedure.

Here, the following case is considered. That is, the unnecessary region R2 described above is eliminated to display the face image I2 at an optimal position in the display unit 16, and the imaging device 12 is rotated downward by the rotation angle $\gamma$ to position the upper end of the display unit 16 away from the upper end of the face detection frame 25 by the distance r (R).

Here, the value of the vertical dimension r of the display region R1 is only required to be determined in advance as a value obtained by, for example, multiplying the vertical dimension f of the face detection frame 25 by k. In this example, k=1.1 is satisfied, and r=1.1×f is satisfied. In this manner, in accordance with the size of the face image I2, the display range above the face image I2 can be set. Note that the value of the constant k can be determined in a freely-selected manner. When the display range above the face image I2 is desired to be secured widely, the constant k is only required to be relatively large. When the display range above the face image I2 is desired to be secured less widely, the constant k is only required to be relatively small.

The rotation angle γ of the imaging device 12 corresponds to the vertical dimension u of the unnecessary region R2. As illustrated in FIG. 5, the vertical dimension u of the unnecessary region R2 can be calculated based on u=s−r. Therefore, in the present example, u=s−r=s−1.1×f is satisfied.

Next, the rotation angle γ corresponding to the vertical dimension u of the unnecessary region R2 is obtained.

In this case, in order to simplify the calculation, an approximate value is obtained while assuming that the optical axis ax1 of the imaging device 12 and the straight line indicating the face image I2 of the observer M are perpendicular to each other.

From FIG. 5 and FIG. 6, Equation (1) given below is derived.

[Mathematical Equation 1]

$$\frac{\tan\left(\frac{\theta}{2}-\gamma\right)}{\tan\frac{\theta}{2}} = \frac{\frac{h}{2}-u}{\frac{h}{2}} \tag{1}$$

When Equation (1) is solved for u, Equation (2) given below is derived.

[Mathematical Equation 2]

$$u = \frac{h}{2}\frac{\tan\frac{\theta}{2}-\tan\left(\frac{\theta}{2}-\gamma\right)}{\tan\frac{\theta}{2}} \tag{2}$$

Here, by a tangent angle addition theorem, Equation (3) given below is derived.

[Mathematical Equation 3]

$$\tan\left(\frac{\theta}{2}-\gamma\right) = \frac{\tan\frac{\theta}{2}-\tan\gamma}{1+\tan\frac{\theta}{2}\tan\gamma} \approx \tan\frac{\theta}{2}\tan\gamma \tag{3}$$

When Equation (2) is modified through use of Equation (3), Equation (4) given below is derived.

[Mathematical Equation 4]

$$u = \frac{h}{2}\frac{\tan\gamma}{\tan\frac{\theta}{2}} \tag{4}$$

When Equation (4) is solved for tan γ, Equation (5) given below is derived.

[Mathematical Equation 5]

$$\tan\gamma = \frac{2u}{h}\tan\frac{\theta}{2} \tag{5}$$

When Equation (5) is solved for γ, Equation (6) given below is derived.

[Mathematical Equation 6]

$$\gamma = \tan^{-1}\left(\frac{2u}{h}\tan\frac{\theta}{2}\right) \tag{6}$$

The values of the parameters h and θ being fixed values determined in advance and the value of the parameter u determined by the dimension s from the upper end of the face detection frame 25 to the upper end of the captured image I1 and the vertical dimension f of the face detection frame 25 are substituted in Equation (6). With this, the angle control unit 22 can calculate the rotation angle γ of the imaging device 12. Subsequently, the angle control unit 22 transmits a control signal based on the rotation angle γ to the rotary drive unit 13. Specifically, the angle control unit 22 calculates the rotation angle γ, based on the vertical dimension h of the captured image I1, the vertical angle of view θ of the imaging device 12, and the vertical dimension u of the unnecessary region R2 positioned above the face image I2. The vertical dimension u can be calculated from the dimension s corresponding to the position of the face detection frame 25 and the vertical dimension f.

In the control method of the imaging display device 10 according to the present exemplary embodiment, the control unit 14 detects the face image I2 of the observer M from the captured image I1, calculates the rotation angle γ of the imaging device 12, based on the vertical dimension f of the face image I2, and controls the rotary drive unit 13, based on the rotation angle γ.

In this manner, with the imaging display device 10 according to the present exemplary embodiment, the face can be displayed at the optimal position in the display unit 16 without enlarging deviation of the lines of sight, even when the height or the seated height of the observer M differ or an observation distance D differs. Specifically, when only deviation of the lines of sight is improved, the inclination angle β of the imaging device 12 is only required to be large. However, as illustrated in FIG. 3, the face of the observer M is not displayed at the optimal position in some cases. Further, when display is performed with a wide space above the face of the observer M, the inclination angle β of the imaging device 12 is only required to be small. However, in this case, as illustrated in FIG. 4, deviation of the lines of sight is considerably large. In contrast, with the imaging display device 10 according to the present exemplary embodiment, the problem in deviation of the lines of sight and the problem of the display position of the face can be improved in a well-balanced manner, and an image causing a less sense of incongruity can be obtained.

Second Exemplary Embodiment

Figure 7:
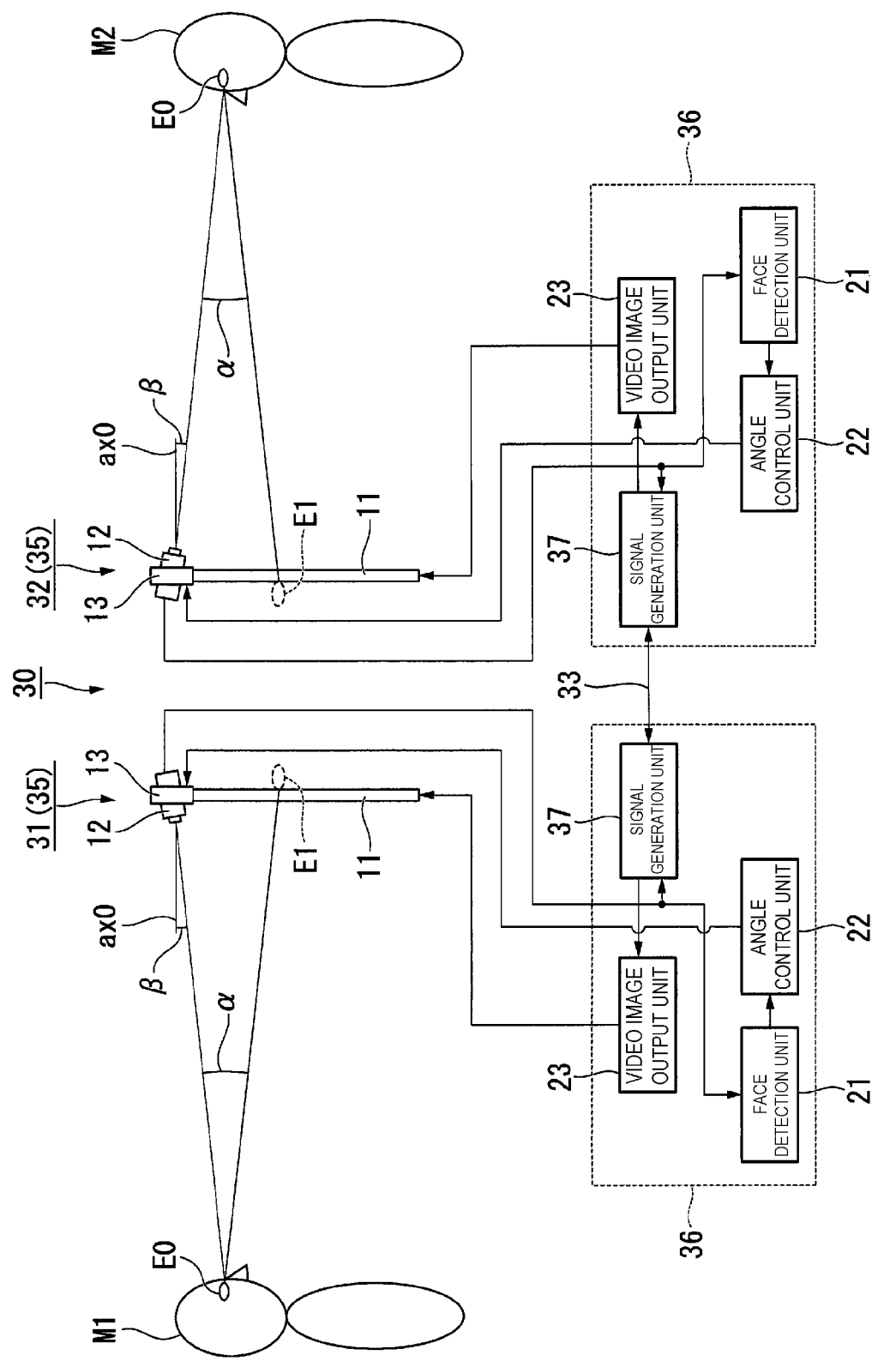
FIG. 7 is a schematic configuration view of an imaging display system according to a second exemplary embodiment.

With reference to FIG. 7, a second exemplary embodiment of the present disclosure is described below.

In the second exemplary embodiment, description is made on an imaging display system in which a video conference can be conducted by installing the imaging display device, which is described in the first exemplary embodiment, in each of two locations.

The basic configuration of the imaging display device used in the present exemplary embodiment is the same as that of the imaging display device according to the first exemplary embodiment, and hence detailed description is omitted.

FIG. 7 is a schematic configuration view of an imaging display system according to the second exemplary embodiment.

In FIG. 7, the components common to those of the drawings of the first exemplary embodiment are denoted with the same reference numerals.

As illustrated in FIG. 7, an imaging display system 30 according to the second exemplary embodiment includes a first terminal device 31 provided at a first location where a first observer M1 is present, a second terminal device 32 provided at a second location where a second observer M2 is present, and a communication unit 33 that communicates an image signal between the first terminal device 31 and the second terminal device 32. The first terminal device 31 and the second terminal device 32 are each constituted of an imaging display device 35, and have the same configuration.

The imaging display device 35 according to the present exemplary embodiment includes the display device 11, the imaging device 12, the rotary drive unit 13, and a control unit 36. The control unit 36 includes the face detection unit 21, the angle control unit 22, the video image output unit 23, and a signal generation unit 37.

The signal generation unit 37 generates an image signal based on the captured image captured by the imaging device 12. The signal generation unit 37 is constituted of, for example, a codec that generates an image signal by encoding a captured image.

The communication unit 33 connects the first terminal device 31 and the second terminal device 32 to each other. The communication unit 33 is constituted of Wide Area Network (WAN)/Local Area Network (LAN) lines. A first image signal generated by the signal generation unit 37 of the first terminal device 31 is transmitted to the second terminal device 32 via the communication unit 33. With this, a captured image captured by the first terminal device 31 is displayed by the second terminal device 32 via the video image output unit 23. Further, a second image signal generated by the signal generation unit 37 of the second terminal device 32 is transmitted to the first terminal device 31 via the communication unit 33. With this, a captured image captured by the second terminal device 32 is displayed by the first terminal device 31 via the video image output unit 23. Note that, in the communication unit 33, a device such as a server may be interposed between the WAN/LAN lines.

In the first terminal device 31 at the first location, the inclination angle β of the imaging device 12 is set optimally. With this, the image with less deviation of the lines of sight of the first observer M1 in which the display position of the face of the first observer M1 is set suitably is displayed by the second terminal device 32. Similarly, in the second terminal device 32 at the second location, the inclination angle β of the imaging device 12 is set optimally. With this, the image with less deviation of the lines of sight of the second observer M2 in which the display position of the face of the second observer M2 is set suitably is displayed by the first terminal device 31. In this manner, deviation of the lines of sight of the first observer M1 and the second observer M2 is suppressed, and each of the faces of the observers M1 and M2 is displayed at the suitable position of the display unit 16.

With the imaging display system 30 according to the present exemplary embodiment, each participant feels a less sense of incongruity, and a video conference can be conducted smoothly while viewing an optimal captured image.

Third Exemplary Embodiment

With reference to FIG. 8 to FIG. 11, a third exemplary embodiment of the present disclosure is described below.

The basic configuration of the imaging display device according to the third exemplary embodiment is the same as that of the imaging display device according to the first exemplary embodiment, but is different in that a detection means in a case where a plurality of observers are imaged is included.

Figure 8:
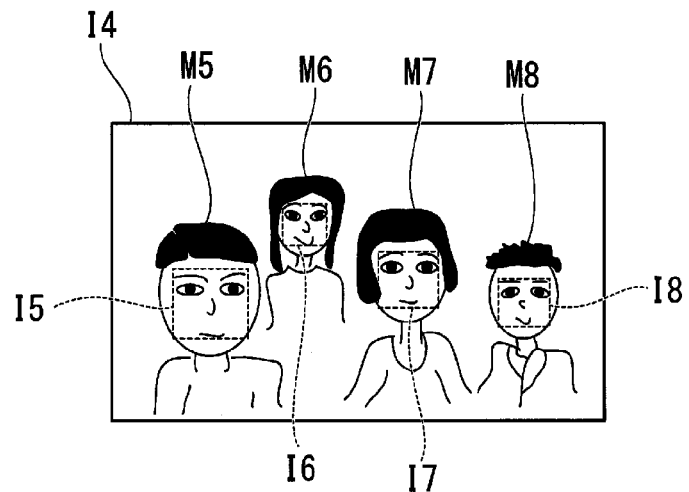
FIG. 8 is a view illustrating an example of a captured image of an imaging display device according to a third exemplary embodiment.

FIG. 8 is a view illustrating an example of a captured image I4 captured by the imaging device of the imaging display device according to the third exemplary embodiment.

As illustrated in FIG. 8, in a case where, with the imaging display device according to the present exemplary embodiment, the imaging device 12 images a plurality of observers M5, M6, M7, and M8, the control unit 14 has a function of detecting a face image of any one participant of the plurality of observers M5, M6, M7, and M8. In the case of the present exemplary embodiment, a configuration in which an observer views the observer and a plurality of observers around the observer may be adopted similarly to the first exemplary embodiment, or a configuration in which an observer views a plurality of observers present at another location may be adopted similarly to the second exemplary embodiment.

Three methods of detecting one face image from a plurality of face images I5, I6, I7, and I8 are described below.

First Method

Figure 9:
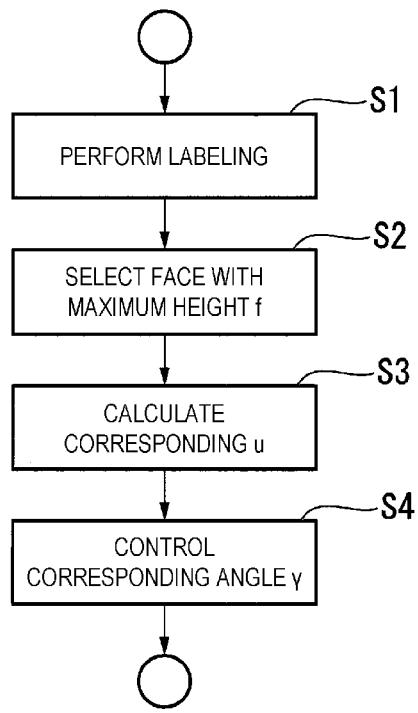
FIG. 9 is a view illustrating a first method of detecting one face image from a plurality of face images in a case where a plurality of observers are imaged.

FIG. 9 is a view illustrating a first method of detecting one face image from a plurality of face images I5, I6, I7, and I8 in a case where the plurality of observers M5, M6, M7, and M8 are imaged.

As illustrated in FIG. 9, first, the face detection unit 21 detects the plurality of face images I5, I6, I7, and I8 on the captured image I4, and performs labeling to the plurality of face images I5, I6, I7, and I8 (Step S1).

Next, the face detection unit 21 detects a face image, that is, a face image with the maximum vertical dimension f of the face detection frame 25 (see FIG. 5), from the plurality of face images I5, I6, I7, and I8 (Step S2).

Next, with respect to the detected face image with the maximum vertical dimension f of the face detection frame 25, the angle control unit 22 calculates the vertical dimension u of the unnecessary region R2 through use of Equation (4) given above (Step S3).

Next, the angle control unit 22 calculates the rotation angle γ of the imaging device 12 through use of the vertical dimension u of the unnecessary region R2, which is calculated from the dimension s from the upper end of the face detection frame 25 to the upper end of the captured image I4 and the dimension f, and Equation (6) (Step S4).

Second Method

Figure 10:
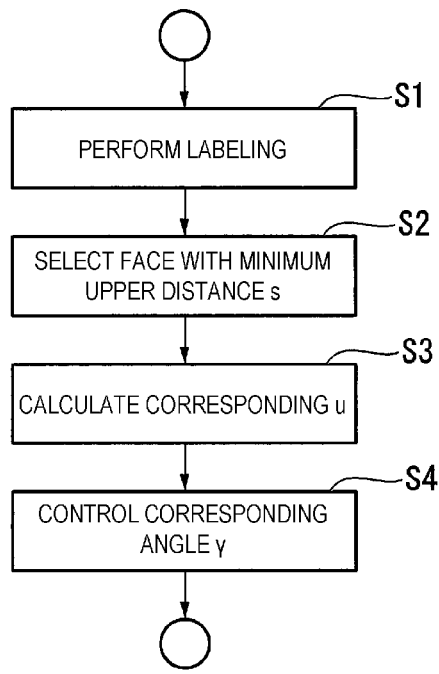
FIG. 10 is a view illustrating a second method of detecting one face image from a plurality of face images in a case where a plurality of observers are imaged.

FIG. 10 is a view illustrating a second method of detecting one face image from a plurality of face images I5, I6, I7, and I8 in a case where the plurality of observers M5, M6, M7, and M8 are imaged.

As illustrated in FIG. 10, first, the face detection unit 21 detects the plurality of face images I5, I6, I7, and I8 on the captured image I4, and performs labeling to the plurality of face images I5, I6, I7, and I8 (Step S1).

Next, the face detection unit 21 detects a face image with the minimum distance s from the upper end of the face detection frame 25 to the upper end of the captured image I4 (see FIG. 5), from the plurality of face images I5, I6, I7, and I8 (Step S2).

Next, with respect to the detected face image with the minimum distance s from the upper end of the face detection frame 25 to the upper end of the captured image I4, the angle control unit 22 calculates the vertical dimension u of the unnecessary region R2 through use of Equation (4) given above (Step S3).

Next, the angle control unit 22 calculates the rotation angle γ of the imaging device 12 through use of the vertical dimension u of the unnecessary region R2, which is calculated from the dimension s from the upper end of the face detection frame 25 to the upper end of the captured image I4 and the dimension f, and Equation (6) (Step S4).

Third Method

Figure 11:
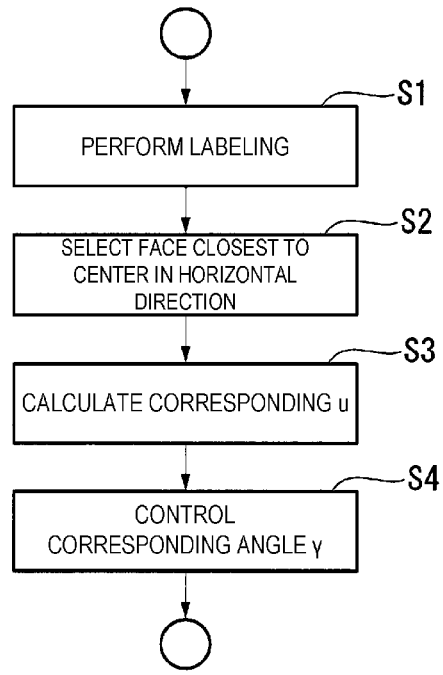
FIG. 11 is a view illustrating a third method of detecting one face image from a plurality of face images in a case where a plurality of observers are imaged.

FIG. 11 is a view illustrating a third method of detecting one face image from a plurality of face images I5, I6, I7, and I8 in a case where the plurality of observers M5, M6, M7, and M8 are imaged.

As illustrated in FIG. 11, first, the face detection unit 21 detects the plurality of face images I5, I6, I7, and I8 on the captured image I4, and performs labeling to the plurality of face images I5, I6, I7, and I8 (Step S1).

Next, the face detection unit 21 detects a face image closest to the center of the captured image I4 in the horizontal direction, from the plurality of face images I5, I6, I7, and I8 (Step S2).

Next, with respect to the detected face image closest to the center of the captured image I4 in the horizontal direction, the angle control unit 22 calculates the vertical dimension u of the unnecessary region R2 through use of Equation (4) given above (Step S3).

Next, the angle control unit 22 calculates the rotation angle γ of the imaging device 12 through use of the vertical dimension u of the unnecessary region R2, which is calculated from the dimension s from the upper end of the face detection frame 25 to the upper end of the captured image I4 and the dimension f, and Equation (6) (Step S4).

Similarly to the first exemplary embodiment, with the imaging display device according to the present exemplary embodiment, the image with less deviation of the lines of sight in which the face is displayed at the suitable position can be obtained even when the plurality of observers are imaged.

In a case of using the first method of detecting one face image from a plurality of face images, with respect to the observer with the maximum dimension of the face image, specifically, the observer who is assumed to be present closest to the imaging device 12, for example, the observer M5 in FIG. 8, the image with less deviation of the lines of sight in which the face is displayed at the suitable position can be obtained even when the plurality of observers are imaged.

In a case of using the second method of detecting one face image from a plurality of face images, the face image of the observer displayed uppermost in the display unit 16, for example, the observer M6 in FIG. 8, is completely displayed. Thus, the face images of all the observers M5, M6, M7, and M8 are completely displayed.

In a case of using the third method of detecting one face image from a plurality of face images, the observer closest to the center of the display unit 16 in the horizontal direction, for example, the observer M7 in FIG. 8 is regarded as the main observer. With respect to the observer, the image with less deviation of the lines of sight in which the face is displayed at the suitable position can be obtained even when the plurality of observers are imaged.

Fourth Exemplary Embodiment

Figure 12:
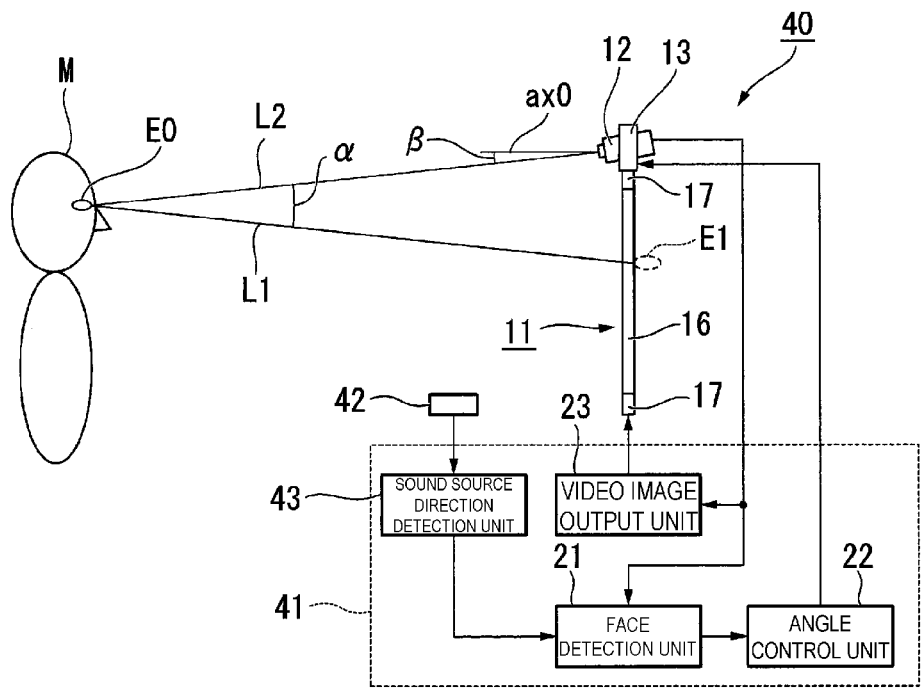
FIG. 12 is a schematic configuration view of an imaging display device according to a fourth exemplary embodiment.
Figure 13:
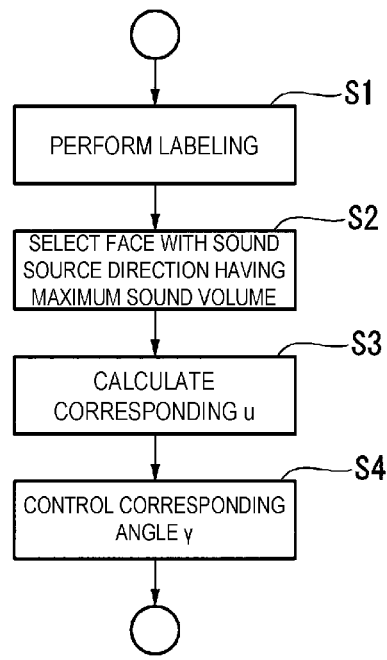
FIG. 13 is a view illustrating a method of detecting one face image from a plurality of face images in a case where a plurality of observers are imaged.

With reference to FIG. 12 and FIG. 13, a fourth exemplary embodiment of the present disclosure is described below.

The basic configuration of the imaging display device according to the fourth exemplary embodiment is the same as that of the imaging display device according to the first exemplary embodiment, but is different in that a means for detecting a sound source direction is included.

FIG. 12 is a schematic configuration view of an imaging display device according to the fourth exemplary embodiment.

In FIG. 12, the components common to those of FIG. 1 used in the first exemplary embodiment are denoted with the same reference numerals, and the description thereof is omitted.

An imaging display device 40 according to the present exemplary embodiment includes the display device 11, the imaging device 12, the rotary drive unit 13, a control unit 41, and a sound detection device 42. The control unit 41 includes the face detection unit 21, the angle control unit 22, the video image output unit 23, and a sound source direction detection unit 43.

The sound detection device 42 is installed at, for example, a freely-selected position in front of the display device 11. The sound detection device 42 detects sound including voices of the plurality of observers M5, M6, M7, and M8 who are present in front of the display device 11. The sound detection device 42 is constituted of, for example, a stereo microphone.

The control unit 41 includes the sound source direction detection unit 43 that detects a sound source having a maximum sound volume from sound data detected by the sound detection device 42 in a case where the imaging device 12 images the plurality of observers M5, M6, M7, and M8.

FIG. 13 is a view illustrating a method of detecting one face image from a plurality of face images I5, I6, I7, and I8 in a case where the plurality of observers M5, M6, M7, and M8 are imaged as illustrated in FIG. 8.

As illustrated in FIG. 13, first, the face detection unit 21 detects the plurality of face images I5, I6, I7, and I8 on the captured image I4, and performs labeling to the plurality of face images I5, I6, I7, and I8 (Step S1).

Next, the sound source direction detection unit 43 detects the sound source direction having the maximum sound volume detected by the sound detection device from the plurality of face images, and outputs the detection result to the face detection unit 21.

Next, based on the detection result obtained by the sound source direction detection unit 43, the face detection unit 21 selects the face image corresponding to the sound source direction having the maximum sound volume (Step S2).

Next, with respect to the detected face image positioned in the sound source direction having the maximum sound volume, the angle control unit 22 calculates the vertical dimension u of the unnecessary region R2 through use of Equation (4) given above (Step S3).

Next, the angle control unit 22 calculates the rotation angle γ of the imaging device 12 through use of the vertical dimension u of the unnecessary region R2, which is calculated from the dimension s from the upper end of the face detection frame 25 to the upper end of the captured image I4 and the dimension f, and Equation (6) (Step S4).

Similarly to the third exemplary embodiment, with the imaging display device 40 according to the present exemplary embodiment, the image with less deviation of the lines of sight in which the face is displayed at the suitable position can be obtained even when the plurality of observers are imaged.

Particularly, in the case of the present exemplary embodiment, for example, a person talking in the loudest voice during a video conference is regarded as a person to be paid most attention to in the situation. Thus, with respect to the person, the image with less deviation of the lines of sight in which the face is displayed at the suitable position can be obtained even when the plurality of observers are imaged.

Note that the technical scope of the present disclosure is not limited to the above-described exemplary embodiment, and various modifications can be made to the above-described exemplary embodiment without departing from the spirit and gist of the present disclosure.

For example, in the imaging display device according to each of the exemplary embodiments, there is given an example in which the control unit has a configuration of automatically selecting one face image that satisfies a specific condition illustrated in FIG. 9 to FIG. 11 or FIG. 13 when a plurality of observers are imaged. In place of this configuration, there may be adopted a configuration in which an observer can freely select one face image from a plurality of face images when a plurality of observers are imaged. For example, there may be adopted a configuration in which, even when a participant has a small face image, in a case where an observer determines that the participant is the main observer, the observer can select the face image of the participant.

Further, there is given an example in which the display device is a liquid crystal display. However, for example, a display device including a projector and a screen may be used. The screen may be any one of a front type and a rear type. Further, a flat panel such as an organic EL display may be adopted. Further, a display device of a naked-eye type, an eye-glass type, or the like with which a three-dimensional image can be visually recognized may be adopted.

In addition, the shape, the number, the arrangement, and the like of each of the constituent elements constituting the imaging display device and the imaging display system are not limited to those in each of the exemplary embodiments, and may be modified as appropriate.

Further, the imaging display system according to one aspect of the present disclosure is not limited to a video conference, but may be used for an amusement purpose such as a game in which participants from a plurality of locations are present, for example.

What is claimed is:

1. An imaging display device, comprising:
an imaging device configured to image a region including a face of an observer and a background, the imaging device being provided to have an optical axis tiltable in a vertical plane;
a rotary drive unit configured to rotate the imaging device by a predetermined angle in the vertical plane;
a display device including a display unit configured to display a captured image captured by the imaging device; and
a control unit configured to control the rotary drive unit, wherein
the control unit includes:
a face detection unit configured to detect a face image of the observer from the captured image; and
an angle control unit configured to calculate a rotation angle of the imaging device, based on a vertical dimension of the captured image, a vertical dimension of the face image detected by the face detection unit, a vertical dimension of a display region that is to be displayed by the display device, a dimension between an upper end of the face image in the captured image and an upper end of an entirety of the captured image, and a vertical angle of view of the imaging device, and to transmit a control signal based on the rotation angle to the rotary drive unit,
wherein the vertical dimension of the display region is defined by multiplying the vertical dimension of the face image with a constant value.

2. The imaging display device according to claim 1, wherein
when the imaging device images a plurality of faces of a plurality of observers, the face detection unit detects, from a plurality of face images, a face image of which the vertical dimension of the face image is maximum.

3. The imaging display device according to claim 1, wherein
when the imaging device images a plurality of faces of a plurality of observers, the face detection unit detects, from a plurality of face images, a face image of which an interval between an upper end of the face image and an upper end of an entirety of a captured image is minimum.

4. The imaging display device according to claim 1, wherein
when the imaging device images a plurality of faces of a plurality of observers, the face detection unit detects, from a plurality of face images, a face image closest to a center of an entirety of a captured image in a horizontal direction.

5. The imaging display device according to claim 1, further comprising:
a sound detection device configured to detect sound including a voice of an observer, wherein
when the imaging device images a plurality of faces of a plurality of observers, the face detection unit detects, from a plurality of face images, a face image positioned in a sound source direction for which a sound volume detected by the sound detection device is maximum.

6. The imaging display device according to claim 1, wherein
the imaging device is provided above the display unit of the display device.

7. The imaging display device according to claim 1, further comprising:
a signal generation unit configured to generate an image signal, based on the captured image.

8. An imaging display system, comprising:
a first terminal device provided at a first location where a first observer is present;
a second terminal device provided at a second location where a second observer is present; and
a communication unit configured to perform communication of the image signal between the first terminal device and the second terminal device, wherein at least one of the first terminal device and the second terminal device is constituted of the imaging display device of claim 7, a first image signal generated by the first terminal device is transmitted to the second terminal device, so that a captured image captured by the first terminal device is displayed by the second terminal device, and a second image signal generated by the second terminal device is transmitted to the first terminal device, so that a captured image captured by the second terminal device is displayed by the first terminal device.

9. A control method of an imaging display device, the imaging display device comprising:

an imaging device configured to image a region including a face of an observer and a background, the imaging device being provided to have an optical axis tiltable in a vertical plane;

a rotary drive unit configured to rotate the imaging device by a predetermined angle in the vertical plane;

a display device including a display unit configured to display a captured image captured by the imaging device; and a control unit configured to control the rotary drive unit, wherein the control unit is configured to:

detect a face image of the observer from the captured image;

calculate a rotation angle of the imaging device, based on a vertical dimension of the captured image, a vertical dimension of the face image, a vertical dimension of a display region that is to be displayed by the display device, a dimension between an upper end of the face image in the captured image and an upper end of an entirety of the captured image, and a vertical angle of view of the imaging device, wherein the vertical dimension of the display region is defined by multiplying the vertical dimension of the face image with a constant value; and control the rotary drive unit, based on the rotation angle.

* * * * *